US005974462A

United States Patent [19]

Aman et al.

[11] Patent Number: 5,974,462

[45] **Date of Patent: *Oct. 26, 1999**

[54] METHOD AND APPARATUS FOR CONTROLLING THE NUMBER OF SERVERS IN A CLIENT/SERVER SYSTEM

[75] Inventors: Jeffrey D. Aman; John E. Arwe, both of Poughkeepsie; David A. Booz, Kingston; David V. Bostjancic; Gregory M. Dritschler, both of Poughkeepsie; Catherine K. Eilert; Peter B. Yocom, both of Wappingers Falls, all of N.Y.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/828,440

[22] Filed: Mar. 28, 1997

[51] Int. Cl.[6] .............................. G06F 13/33; G06F 15/17

[52] U.S. Cl. .............................. 709/225; 709/104; 709/223

[58] Field of Search .............................. 395/200.33, 672, 395/673, 674, 675; 709/203, 225, 224, 223, 102, 103, 104, 105

[56] References Cited

U.S. PATENT DOCUMENTS

| | | | |
|---|---|---|---|
| 3,702,006 | 10/1972 | Page | 444/1 |
| 5,031,089 | 7/1991 | Liu et al. | 364/200 |
| 5,155,858 | 10/1992 | DeBruler et al. | 395/800 |
| 5,212,793 | 5/1993 | Donica et al. . | |
| 5,249,290 | 9/1993 | Heizer . | |
| 5,276,897 | 1/1994 | Stalmarck | 395/800 |
| 5,283,897 | 2/1994 | Georgiadis et al. | 395/650 |
| 5,437,032 | 7/1995 | Wolf et al. . | |
| 5,459,864 | 10/1995 | Brent et al. | 395/650 |
| 5,473,773 | 12/1995 | Aman et al. . | |
| 5,504,894 | 4/1996 | Ferguson et al. . | |
| 5,537,542 | 7/1996 | Eilert et al. . | |
| 5,539,883 | 7/1996 | Allon et al. | 395/200.11 |
| 5,603,029 | 2/1997 | Aman et al. . | |
| 5,655,120 | 8/1997 | Witte et al. | 395/675 |
| 5,675,739 | 10/1997 | Eilert et al. | 395/200.11 |

FOREIGN PATENT DOCUMENTS

694837A1 7/1994 European Pat. Off. .

OTHER PUBLICATIONS

*MVS Planning: Workload Management,* IBM Publication GC28–1761–00, 1996.

*MVS Programming: Workload Management Services,* IBM Publication GC28–1773–00, 1996.

"Optimal Control Of A Removable . . . With Finite Capacity", by, Wang et al., Microelectron. Reliab. (UK) vol. 35, No. 7, Jul. 1995, P1023–30.

"Providing Distributed Computing Environment Servers On Client Demand", IBM TDB, vol. 38, No. 3, Mar. 1995, P231–233.

"Queue–Dependent Servers", by V.P. Singh, IBM TR 221301, Jun. 30, 1971.

"Queue Dependent Servers Queueing System", by Garg et al., Microelectron. Reliab. (UK) vol. 33, No. 15, Dec. 1993, P2289–95.

*Primary Examiner*—Mark H. Rinehart

*Attorney, Agent, or Firm*—William A. Kinnaman, Jr.

[57] ABSTRACT

A method and apparatus for controlling the number of servers in an information handling system in which incoming work requests belonging to a first service class are placed in a queue for processing by one or more servers. The system also has units of work assigned to a second service class that acts as a donor of system resources. In accordance with the invention, a performance measure is defined for the first service class as well as for the second service class. Before adding servers to the first service class, there is determined not only the positive effect on the performance measure for the first service class, but also the negative effect on the performance measure for the second service class. Servers are added to the first service class only if the positive effect on the performance measure for the first service class outweighs the negative effect on the performance measure for the second service class.

11 Claims, 5 Drawing Sheets

METHOD AND APPARATUS FOR CONTROLLING THE NUMBER OF SERVERS IN A CLIENT/SERVER SYSTEM

CROSS-REFERENCE TO RELATED APPLICATION(S)

This application is related to the following commonly owned, concurrently filed application(s), incorporated herein by reference:

D. F. Ault et al., "Method and Apparatus for Transferring File Descriptors in a Multiprocess, Multithreaded Client/Server System", Ser. No. 08/825,302.

D. F. Ault et al., "Method and Apparatus for Controlling the Assignment of Units of Work to a Workload Enclave in a Client/Server System", Ser. No. 08/825, 304.

BACKGROUND OF THE INVENTION

1. Field of the Invention

This invention relates to a method and apparatus for controlling the number of servers in an information handling system in which incoming work requests belonging to a first service class are placed in a queue for processing by one or more servers.

2. Description of the Related Art

Systems in which incoming work requests are placed in a queue for assignment to an available server are well known in the art. Since the frequency at which the incoming requests arrive may not be readily controlled, the principal means of controlling system performance (measured by queue delay or the like) in such a queued system is to control the number of servers. Thus, it is known in the art to start an additional server when the length of the queue being served reaches a certain high threshold or to stop a server when the length of the queue being served reaches a certain low threshold. While such an expedient may achieve its design objectives, it is unsatisfactory in a system in which other units of work besides the queued work requests are contending for system resources. Thus, even though providing an additional server for a queue may enhance the performance of the work requests in that queue, providing such a server may so degrade the performance of other units of work being handled by the system that the performance of the system as a whole deteriorates.

Current operating system software is not able to take over the responsibility for managing the number of servers according to the end-user oriented goals specified for the work requests and considering other work with independent goals running in the same computer system.

SUMMARY OF THE INVENTION

The present invention relates to a method and apparatus for controlling the number of servers in an information handling system in which incoming work requests belonging to a first service class are placed in a queue for processing by one or more servers. The system also has units of work assigned to a second service class that acts as a donor of system resources. In accordance with the invention, a performance measure is defined for the first service class as well as for the second service class. Before adding servers to the first service class, there is determined not only the positive effect on the performance measure for the first service class, but also the negative effect on the performance measure for the second service class. Servers are added to the first service class only if the positive effect on the performance measure for the first service class outweighs the negative effect on the performance measure for the second service class.

The present invention allows system management of the number of servers for each of a plurality of user performance goal classes based on the performance goals of each goal class. Tradeoffs are made that consider the impact of addition or removal of servers on competing goal classes.

BRIEF DESCRIPTION OF THE DRAWINGS

The detailed description explains the preferred embodiments of the present invention, together with advantages and features, by way of example with reference to the following drawings.

DETAILED DESCRIPTION OF THE INVENTION

Figure 1:
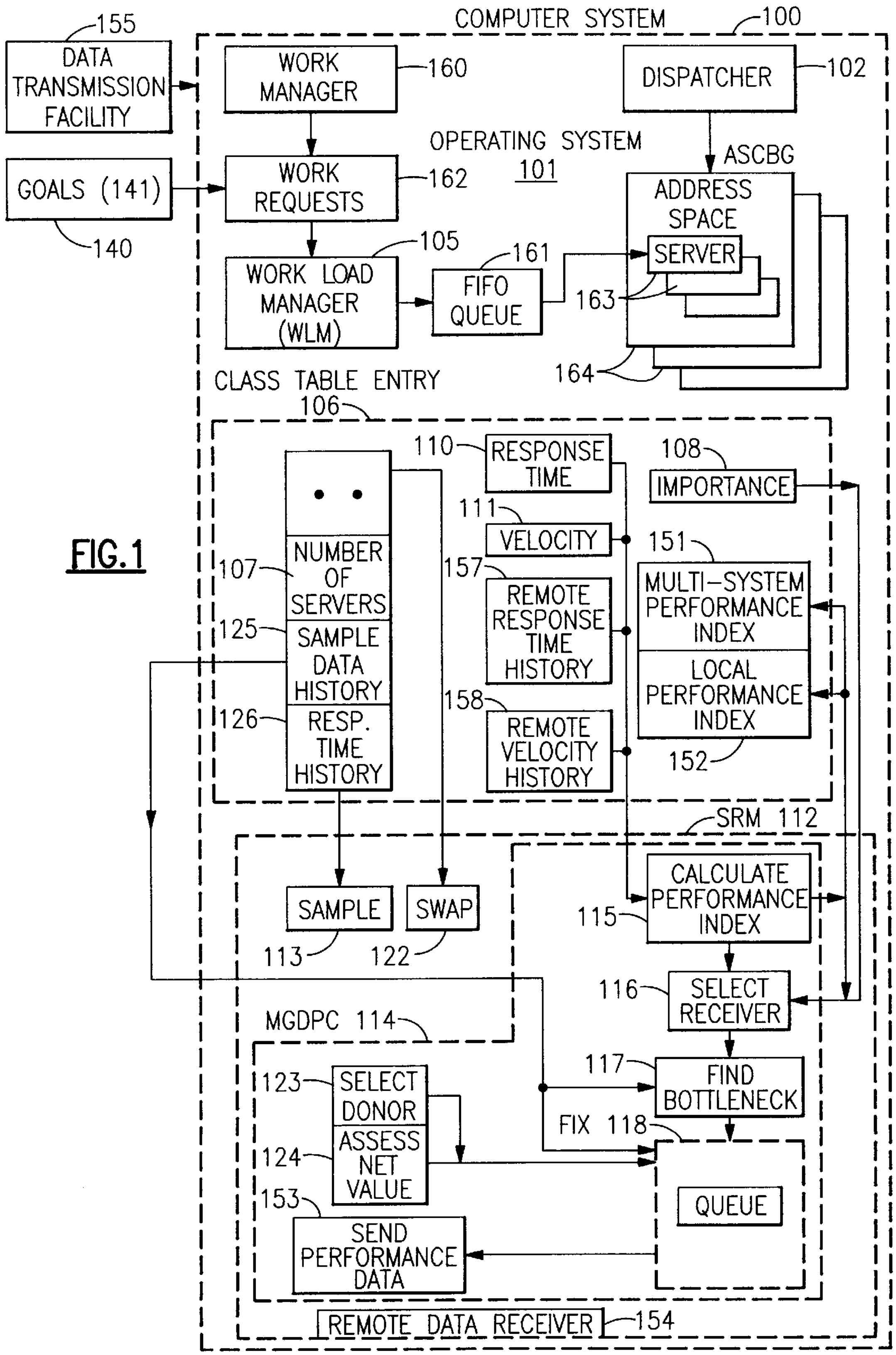
FIG. 1 is a system structure diagram showing particularly a computer system having a controlling operating system and system resource manager component adapted as described for the present invention.

As a preliminary to discussing a system incorporating the present invention, some prefatory remarks about the concept of workload management (upon which the present invention builds) are in order.

Workload management is a concept whereby units of work (processes, threads, etc.) that are managed by an operating system are organized into classes (referred to as service classes or goal classes) that are provided system resources in accordance with how well they are meeting predefined goals. Resources are reassigned from a donor class to a receiver class if the improvement in performance of the receiver class resulting from such reassignment exceeds the degradation in performance of the donor class, i.e., there is a net positive effect in performance as determined by predefined performance criteria. Workload management of this type differs from the run-of-the-mill resource management performed by most operating systems in that the assignment of resources is determined not only by its effect on the work units to which the resources are reassigned, but also by its effect on the work units from which they are taken.

Workload managers of this general type are disclosed in the following commonly owned patents, pending patent applications and non-patent publications, incorporated herein by reference:

U.S. Pat. No. 5,504,894 to D. F. Ferguson et al., entitled "Workload Manager for Achieving Transaction Class Response Time Goals in a Multiprocessing System";

U.S. Pat. No. 5,473,773 to J. D. Aman et al., entitled "Apparatus and Method for Managing a Data Processing System Workload According to Two or More Distinct Processing Goals";

U.S. Pat. No. 5,537,542 to C. K. Eilert et al., entitled "Apparatus and Method for Managing a Server Workload According to Client Performance Goals in a Client/Server Data Processing System";

U.S. Pat. No. 5,603,029, to J. D. Aman et al., entitled "System of Assigning Work Requests Based on Classifying into an Eligible Class Where the Criteria Is Goal Oriented and Capacity Information is Available";

U.S. application Ser. No. 08/383,168, filed Feb. 3, 1995, of C. K. Eilert et al., U.S. Pat. No. 5,675,739 entitled "Apparatus and Method for Managing a Distributed Data Processing System Workload According to a Plurality of Distinct Processing Goal Types";

U.S. application Ser. No. 08/383,042, filed Feb. 3, 1995, of C. K. Eilert et al., now abandoned in favor of Ser. No. 08/848,763, filed May 1, 1997,entitled "Multi-System Resource Capping";

U.S. application Ser. No. 08/488,374, filed Jun. 7, 1995, of J. D. Aman et al., entitled "Apparatus and Accompanying Method for Assigning Session Requests in a Multi-Server Sysplex Environment";

MVS Planning: Workload Management, IBM publication GC28-1761-00, 1996;

MVS Programming: Workload Management Services, IBM publication GC28-1773-00, 1996.

Of the patents and applications, U.S. Pat. Nos. 5,504,894 and 5,473,773 disclose basic workload management systems; U.S. Pat. No. 5,537,542 discloses a particular application of the workload management system of U.S. Pat. No. 5,473,773 to client/server systems; applications 08/383,168 and 08/383,042 disclose particular applications of the workload management system of U.S. Pat. No. 5,473,773 to multiple interconnected systems; U.S. Pat. No. 5,603,029 relates to the assignment of work requests in a multi-system complex ("sysplex"); and application Ser. No. 08/488,374 relates to the assignment of session requests in such a complex. The two non-patent publications describe an implementation of workload management in the IBM® OS/390™ (formerly MVS®) operating system.

FIG. 1 illustrates the environment and the key features of the present invention for an exemplary embodiment. The environment of this invention is that of a queue of work requests and a pool of servers which service the work requests. This invention allows management of the number of servers based on the performance goal classes of the queued work and the performance goal classes of competing work in the computer system. Those skilled in the art will recognize that any number of such queues and groups of servers within the computer system may be used without departing from the spirit or scope of this invention. The computer system 100 is executing a workload and is controlled by its own copy of an operating system 101 such as the IBM OS/390 operating system. The operating system 101 executes the steps described in this specification.

Except for the enhancements relating to the present invention, system 100 is the one disclosed in copending application Ser. No. 08/383,168. Although not shown in FIG. 1, system 100 may be one of a plurality of interconnected systems that are similarly managed and make up a sysplex. As taught in copending application Ser. No. 08/383,168, the performance of various service classes into which units of work may be classified may be tracked not only for a particular system, but for the sysplex as a whole. To this end, and as will be apparent from the description below, means are provided for communicating performance results between system 100 and other systems in the sysplex. However, since this sysplex-wide mode of operation is not an essential part of the present invention, it is discussed only in passing in this specification. In general, the reader may refer to the copending application Ser. No. 08/383,168 for this and other details of operation of the system 100 not directly related to the present invention.

Dispatcher 102 is a component of the operating system 101 that selects the unit of work to be executed next by the computer. The units of work 150 are the application programs that do the useful work that is the purpose of the computer system 100. The units of work that are ready to be executed are represented by a chain of control blocks in the operating system memory called the address space control block (ASCB) queue.

Work manager 160 is a component outside of the operating system 101 which uses operating system services to define one or more queues 161 to the workload manager 105 and to insert work requests 162 onto these queues. The workload manager 105 maintains the inserted requests 162 in first-in first-out order for selection by servers 163 of the work manager 160.

Servers 163 are components of the work manager 160 which are capable of servicing queued work requests 162. When the workload manager 105 starts a server 163 to service requests 162 for a work manager 160's queue 161, the workload manager uses the server definitions 141 stored on a shared data facility 140 to start an address space (i.e., process) 164. The address space 164 started by the workload manager 105 contains one or more servers (i.e., dispatchable units or tasks) 163 which service requests 162 on the particular queue 161 that the address space should service, as designated by the workload manager.

In a sysplex comprising a plurality of systems 100, any suitable means may be used to route incoming work requests 162 to a particular system based on the capacity of the system to handle new requests, such as that shown in U.S. Pat. No. 5,603,029 or copending application Ser. No. 08/488,374.

Figure 1A:
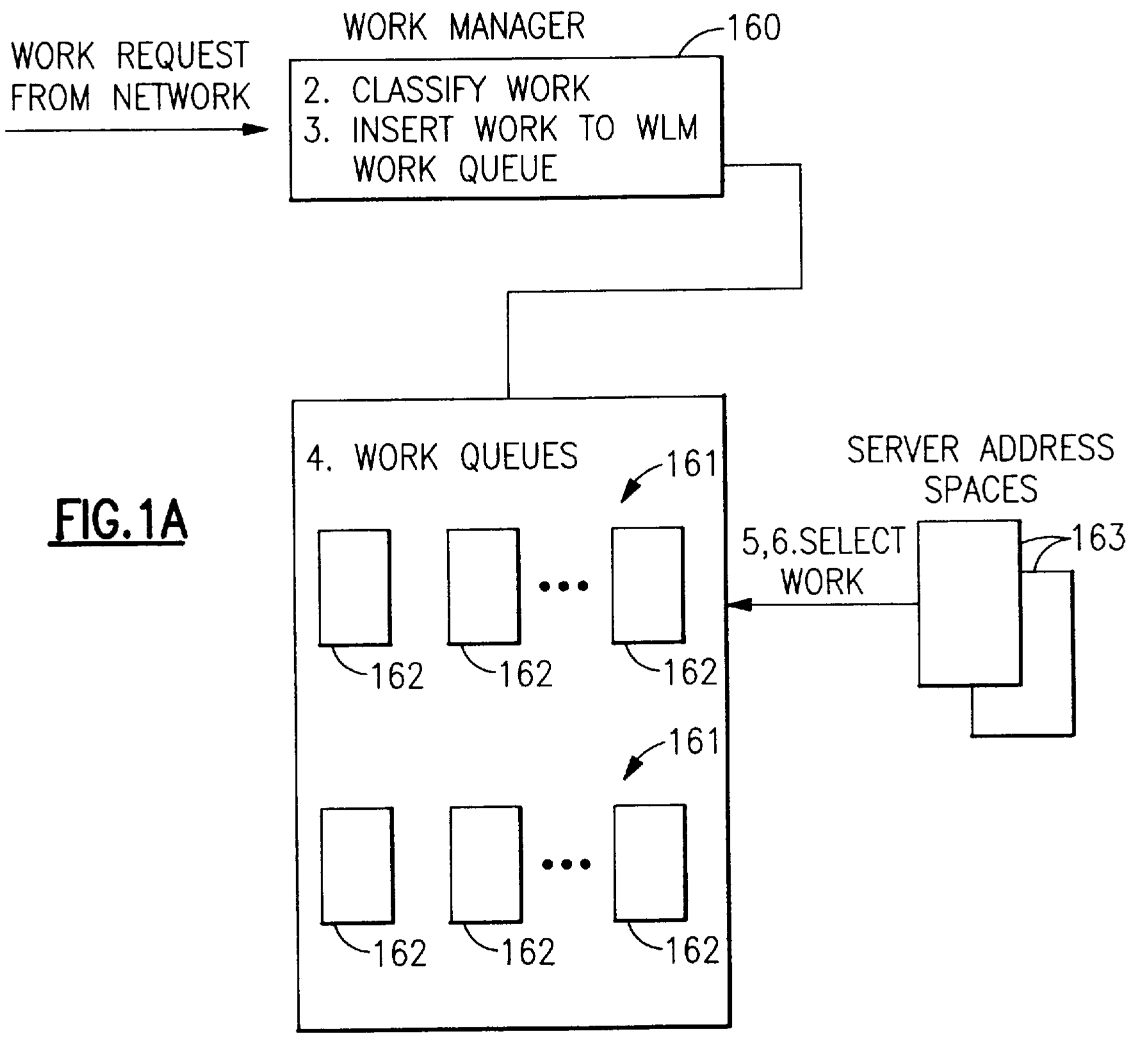
FIG. 1A shows the flow of a client work request from the network to a server address space managed by the workload manager of the present invention.

FIG. 1A shows the flow of a client work request 162 from a network (not shown) to which system 100 is connected to a server address space 164 managed by the workload manager 105. A work request 162 is routed to a particular system 100 in the sysplex and received by a work manager 160. Upon receiving the work request 162, the work manager 160 classifies it to a WLM service class and calls the workload manager 105 to insert the work request in to a WLM work queue 161. The work request 162 waits in the work queue 161 until there is a server 163 ready to run it.

A task 163 in a server address space 164 that is ready to run a new work request 162 (either the space has just been started or the task finished running a previous request) calls the workload manager 105 for a new work request. If there is a request 162 on the work queue 161 the address space 164 is serving, the workload manager 105 passes the request to the server 163. Otherwise, the workload manager 105 suspends the server 163 until a request 162 is available.

When a work request 162 is passed to the workload manager 105, it is put on a work queue 161 to wait for a server 163 to be available to run the request. There is one work queue 161 for each unique combination of work manager 160, application environment name, and WLM service class of the work request 162. (An application environment is the environment that a set of similar client work requests 162 needs to execute. In OS/390 terms this maps to the job control language (JCL) procedure that is used to start the server address space to run the work requests.) The queuing structures are built dynamically when the first work request 162 for a specific work queue 161 arrives. The structures are deleted when there has been no activity for a work queue 161 for a predetermined period of time (e.g., an hour). If an action is taken that can change the WLM service class of the queued work requests 162, like activating a new WLM policy, the work queues 161 are dynamically rebuilt to reflect the new WLM service class of each work request 162.

One server address space 164 is started when the first work request 162 arrives for a work queue 161. Subsequent spaces 164 are started when required to support the workload (see policy adjustment discussion below). Preferably, the mechanism to start spaces 164 has several features to avoid common problems in other implementations that automatically start spaces. Thus, starting of spaces 164 is preferably paced so that only one start is in progress at time. This pacing avoids flooding the system 100 with address spaces 164 being started.

Also, special logic is preferably provided to prevent creation of additional address spaces 164 for a given application environment if a predetermined number of consecutive start failures (e.g., 3 failures) are encountered for which the likely cause is a JCL error in the JCL proc for the application environment. This avoids getting into a loop trying to start an address spaces that will not successfully start until the JCL error is corrected.

Additionally, if a server address space 164 fails while running a work request 162, workload manager 105 preferably starts a new address space to replace it. Repeated failures will cause workload manager to stop accepting work requests for the application environment until informed by an operator command that the problem has been solved.

A given server address space 164 is physically capable of serving any work request 162 for its application environment even though it will normally only serve a single work queue 161. Preferably, when a server address space 164 is no longer needed to support its work queue 161, it is not terminated immediately. Instead, the server address space 164 waits for a period of time as a "free agent" to see if it can be used to support another work queue 161 with the same application environment. If the server address space 164 can be shifted to a new work queue 161, the overhead of starting a new server address space for that work queue is avoided. If the server address space 164 is not needed by another work queue 161 within a predetermined period (e.g., 5 minutes), it is terminated.

The present invention takes as input the performance goals and server definitions 141 established by a system administrator and stored on a data storage facility 140. The data storage facility 140 is accessible by each system 100 being managed. The performance goals illustrated here are of two types: response time (in seconds) and execution velocity (in percent). Those skilled in the art will recognize that other goals, or additional goals, may be chosen without departing from the spirit or scope of this invention. Included with the performance goals is the specification of the relative importance of each goal. The goals 141 are read into each system 100 by a workload manager (WLM) component 105 of the operating system 101 on each of the systems being managed. Each of the goals, which were established and specified by the system administrator, causes the workload manager 105 on each system 100 to establish a performance class to which individual work units will be assigned. Each performance class is represented in the memory of the operating systems 101 by a class table entry 106. The specified goals (in an internal representation) and other information relating to the performance class are recorded in the class table entry. Other information stored in a class-table entry includes the number of servers 163 (107) (a controlled variable), the relative importance of the goal class (108) (an input value), the multi-system performance index 151, the local performance index 152 (computed values), the response time goal 110 (an input value), the execution velocity goal 111 (an input value), sample data 125 (measured data), the remote response time history (157) (measured data), the remote velocity history 158 (measured data), the sample data history 125 (measured data), and the response time history 126 (measured data).

Operating system 101 includes a system resource manager (SRM) 112, which in turn includes a multi-system goal-driven performance controller (MGDPC) 114. These components operate generally as described in U.S. Pat. No. 5,473,773 to J. D. Aman et al. and copending application Ser. No. 08/383,168. However, MGDPC 114 is modified according to the present invention to manage the number of servers 163. MGDPC 114 performs the functions of measuring the achievement of goals, selecting the user performance goal classes that need their performance improved, and improving the performance of the user performance goal classes selected by modifying the controlled variables of the associated work units, as described later. The MGDPC function is performed periodically based on a periodic timer expiration approximately every ten seconds in the preferred embodiment.

The general manner of operation of MGDPC 114, as described in copending application Ser. No. 08/383,168, is as follows. At 115, a multi-system performance index 151 and a local performance index 152 are calculated for each user performance goal class 106 using the specified goal 110 or 111. The multi-system performance index 151 represents the performance of work units associated with the goal class across all the systems being managed. The local performance index 152 represents the performance of work units associated with the goal class on the local system 100. The resulting performance indexes 151, 152 are recorded in the corresponding class table entry 106. The concept of a performance index as a method of measuring user performance goal achievement is well known. For example, in the above-cited U.S. Pat. No. 5,504,894 to Ferguson et al., the performance index is described as the actual response time divided by the goal response time.

At 116, a user performance goal class is selected to receive a performance improvement in the order of the relative goal importance 108 and the current value of the performance indexes 151, 152. The selected user performance goal class is referred to as the receiver. MGDPC 114 first uses the multi-system performance index 151 when choosing a receiver so that the action it takes has the largest possible impact on causing work units to meet goals across all the systems being managed. When there is no action to take based on the multi-system performance index 151, the local performance index 152 is used to select a receiver that will most help the local system 100 meet its goals.

After a candidate receiver class has been determined, the controlled variable for that class that constitutes a performance bottleneck is determined at 117 by using state samples 125, a well-known technique. As described in copending application Ser. No. 08/383,168, the controlled variables include such variables as protective processor storage target (affects paging delay), swap protect time (SPT) target (affects swap delay), multiprogramming level (MPL) target (affects MPL delay), and dispatch priority (affects CPU delay). In accordance with the present invention, the controlled variables also include the number of servers 163, which affects queue delay.

In FIG. 1 the number of servers 163 (107) is shown stored in the class table entry 106, which might be taken to imply a limitation of one queue 161 per class. However, this is merely a simplification for illustrative purposes; those skilled in the art will recognize that multiple queues 161 per class can be independently managed simply by changing the location of the data. The fundamental requirements are that the work requests 162 for a single queue 161 have only one goal, that each server 163 has equal capability to service requests, and that a server cannot service work on more than one queue 161 without notification from and/or to the workload manager 105.

After a candidate performance bottleneck has been identified, the potential changes to the controlled variables are considered at 118. At 123 a user performance goal class is selected for which a performance decrease can be made based on the relative goal importance 108 and the current value of the performance indexes 151, 152. The user performance goal class thus selected is referred to as the donor.

After a candidate donor class has been selected, the proposed changes are assessed at 124 for net value relative to the expected changes to the multi-system and local performance indexes 151, 152 for both the receiver and the donor for each of the controlled variables, including the number of servers 163 (107) and the variables mentioned above and in copending application Ser. No. 08/383,168. A proposed change has net value if the result would yield more improvement for the receiver than harm to the donor relative to the goals. If the proposed change has net value, then the respective controlled variable is adjusted for both the donor and the receiver.

Each system 100 to be managed is connected to a data transmission mechanism 155 that allows each system to send data records to every other system. At 153 a data record describing the recent performance of each goal class is sent to every other system 100.

The multi-system goal driven performance controller (MGDPC) function is performed periodically, (once every ten seconds in the preferred embodiment) and is invoked via a timer expiration. The functioning of the MGDPC provides a feedback loop for the incremental detection and correction of performance problems so as to make the operating system 101 adaptive and self-tuning.

At 154 a remote data receiver receives performance data from remote systems asynchronously from MGDPC 114. The received data is placed in a remote performance data histories (157,158) for later processing by the MGDPC 114.

Figure 2:
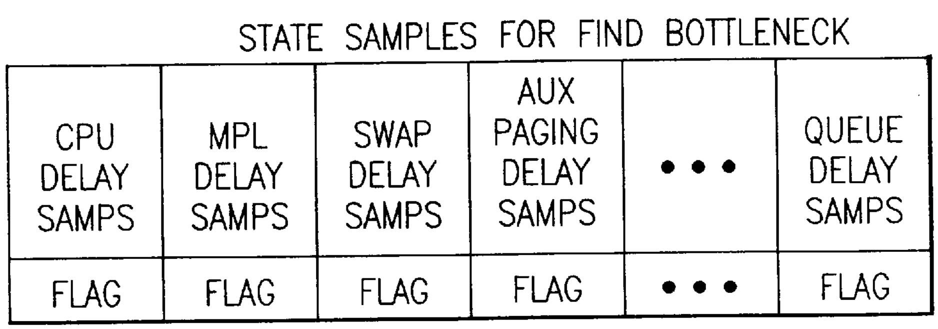
FIG. 2 illustrates the state data used to select resource bottlenecks.

FIG. 2 illustrates the state data used to select resource bottlenecks (117) to address. For each delay type, the performance goal class table entry 106 contains the number of samples encountering that delay type and a flag indicating whether the delay type has already been selected as a bottleneck during the present invocation of MGDPC 114. In the case of the cross-memory-paging type delay, the class table entry 106 also contains identifiers of the address spaces that experienced the delays.

Figure 3:
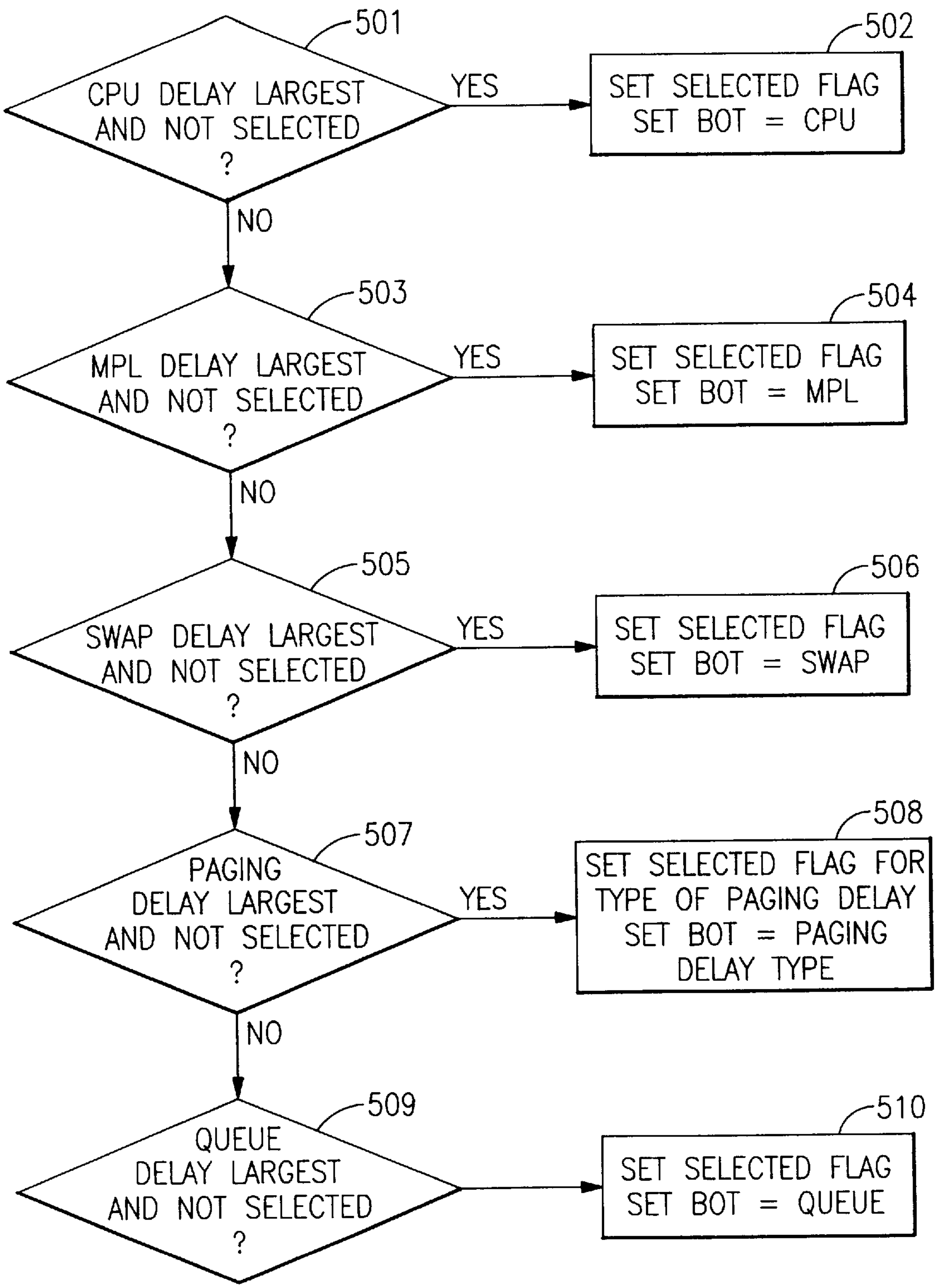
FIG. 3 is a flowchart showing logic flow for the find-bottleneck function.

The logic flow of the find bottleneck means 117 is illustrated in FIG. 3. The selection of a bottleneck to address is made by selecting the delay type with the largest number of samples that has not already been selected during the present invocation of MGDPC 114. When a delay type is selected, the flag is set so that delay type is skipped if the find bottleneck means is reinvoked during this invocation of MGDPC 114.

In FIG. 3 at 501, a check is made to determine whether the CPU delay type has the largest number of delay samples of all the delay types that have not yet been selected. If yes, at 502 the CPU-delay-selected flag is set and CPU delay is returned as the next bottleneck to be addressed.

At 503 a check is made to determine whether the MPL delay type has the largest number of delay samples of all the delay types that have not yet been selected. If yes, at 504 the MPL-delay-selected flag is set and MPL delay is returned as the next bottleneck to be addressed.

At 505 a check is made to determine whether the swap delay type has the largest number of delay samples of all the delay types that have not yet been selected. If yes, at 506 the swap-delay-selected flag is set and swap delay is returned as the next bottleneck to be addressed.

At 507 a check is made to determine whether the paging delay type has the largest number of delay samples of all the delay types that have not yet been selected. If yes, at 508 the paging-delay-selected flag is set and paging delay is returned as the next bottleneck to be addressed. There are five types of paging delay. At step 507, the type with the largest number of delay samples is located, and at 508, the flag is set for the particular type and the particular type is returned. The types of paging delay are: private area, common area, cross memory, virtual input/output (VIO), and hiperspace each corresponding to a page delay situation well known in the environment of the preferred embodiment (MVS/ESA) (TM).

Finally, at 509 a check is made to determine whether the queue delay type has the largest number of delay samples of all the delay types that have not yet been selected. If yes, at 510 the queue-delay-selected flag is set and queue delay is returned as the next bottleneck to be addressed.

The following section describes how the receiver performance goal class performance is improved by changing a controlled variable to reduce the delay selected by the find bottleneck means and, in particular, how performance is improved by reducing the queue delay experienced by the receiver.

Figure 4:
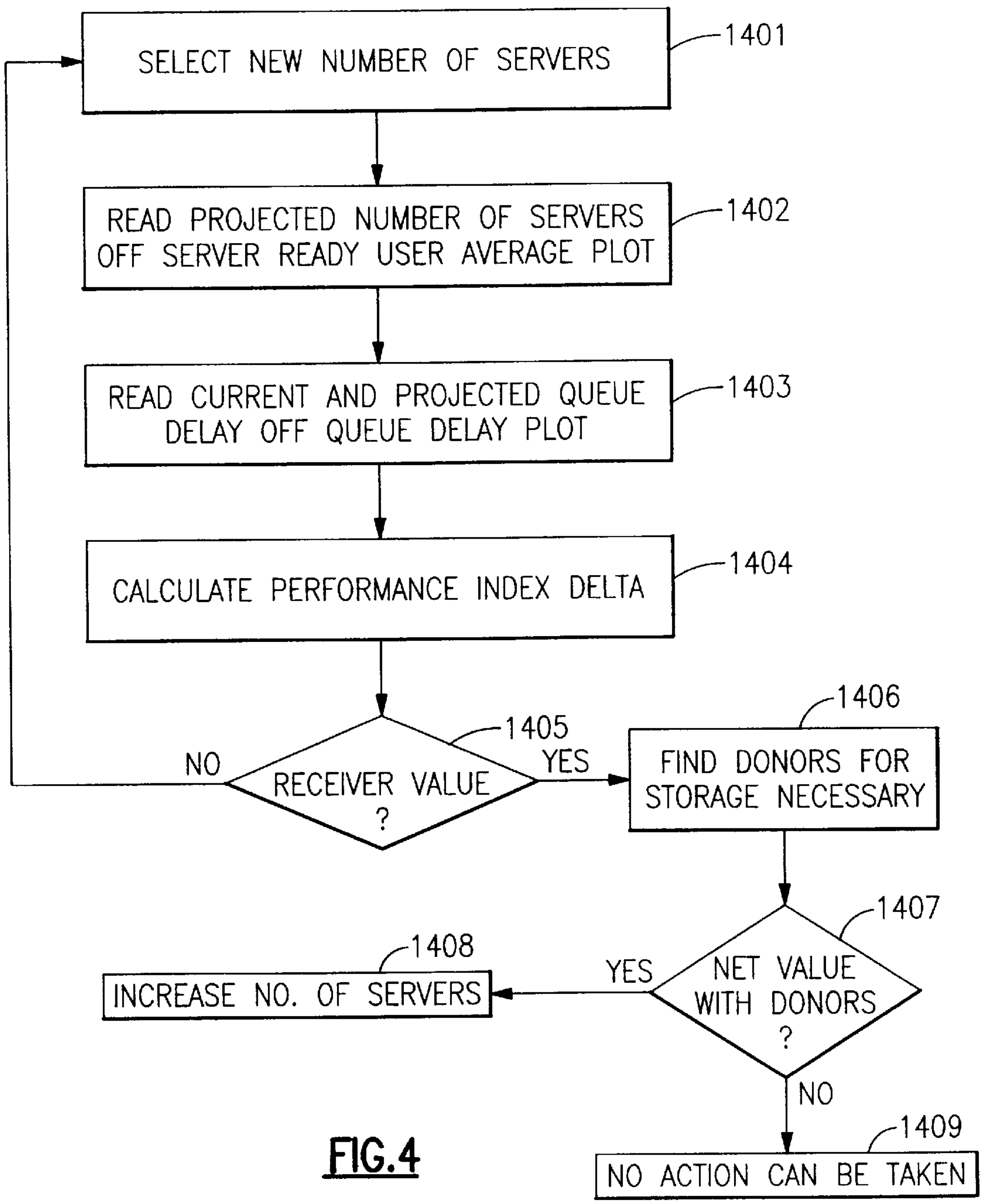
FIG. 4 is a flowchart of the steps to assess improving performance by increasing the number of servers.
Figure 5:
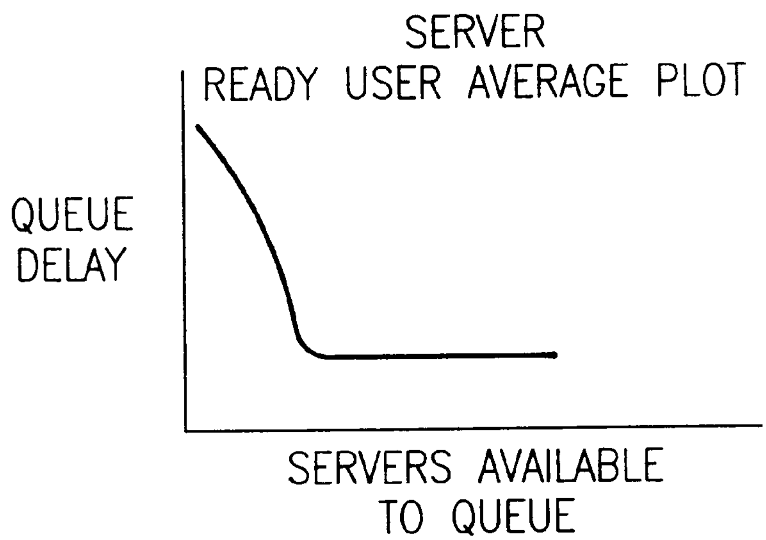
FIG. 5 is a sample graph of server ready user average.
Figure 6:
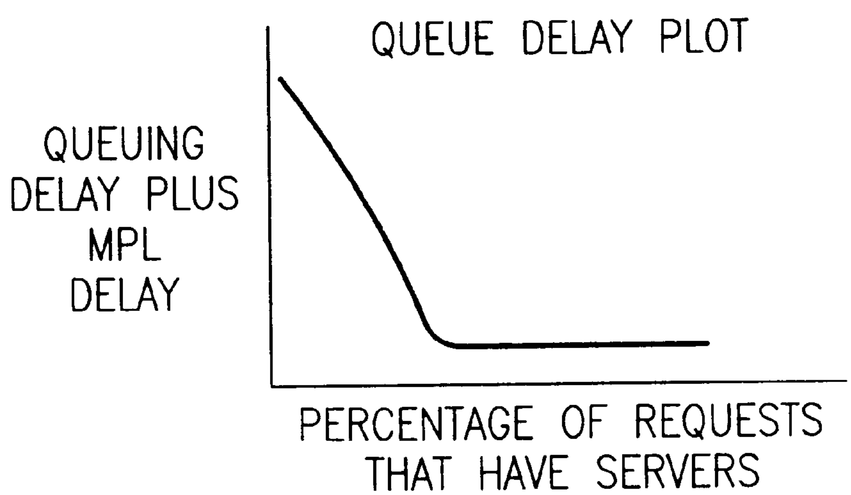
FIG. 6 is a sample graph of queue delay.

FIG. 4 shows the logic flow to assess improving performance by starting additional servers 163. FIGS. 4–6 provide the steps involved in making the performance index delta projections provided by the fix means 118 to the net value means 124. At 1401, a new number of servers 163 is selected to be assessed. The number must be large enough to result in sufficient receiver value (checked at 1405) to make the change worthwhile. The number must not be so large that the value of additional servers 163 is marginal, for example, not more than the total number of queued and running work requests 162.

At 1402, the projected number of work requests 162 at the new number of servers 163 is read from the server ready user average graph shown in FIG. 5. At 1403, the current and projected queue delays are read from the queue delay graph shown in FIG. 6. At 1404, the projected local and multi-system performance index deltas are calculated. These calculations are shown below.

At 1405, a check is made for sufficient receiver value provided by the additional number of servers 163. Preferably, this step includes the step of determining whether the new server 163 would get enough CPU time to make adding it worthwhile. If there is not sufficient receiver value, control returns to 1401 where a larger number of servers 163 is selected to be assessed.

If there is sufficient receiver value, at 1406 select donor means 123 is called to find donors for the storage needed to start the additional servers 163 on behalf of the receiver performance goal class.

The controlled variable that is adjusted for the donor class need not necessarily be the number of servers 163 (107) for that class. Any one of several different controlled variables of the donor class, such as MPL slots or protected processor storage, may be alternatively or additionally adjusted to provide the necessary storage for the additional servers. The manner of assessing the effect on the donor class of adjusting such controlled variables, while forming no part of the present invention, is described in copending application Ser. No. 08/383,168 and U.S. Pat. No. 5,537,542.

At 1407, a check is made to ensure that there is net value in taking storage from the donors to increase the number of servers 163 for the receiver class. As described in copending application Ser. No. 08/383,168, this may be determined using one or more of several different criteria, such as whether the donor is projected to meet its goals after the resource reallocation, whether the receiver is currently missing its goals, whether the receiver is a more important class than the donor, or whether there is a net gain in the combined performance indexes of the donor and the receiver. If there is net value, the additional servers 163 are started at 1408; otherwise, the receiver goal class queue delay problem cannot be solved (1409).

At 1408, logic is included to temporarily defer requests to start new servers 163 for the queue 161 under certain circumstances. Concurrent requests to start new servers 163 are limited to avoid unnecessary impact to existing work. This pacing ensures that the operating system 101 is not flooded with many concurrent requests to start additional servers 163, which can be disruptive. Detection of faulty information in the data repository 141 provided by the system administrator is also implemented, to prevent infinite retry loops if the server definition information is incorrect to the degree that new servers 163 cannot be successfully started. Once a server 163 is started, logic is also included to automatically replace a server should it fail unexpectedly. Idle servers 163 with identical server definition information but serving different queues 161 for the same work manager 160 may be moved between queues in order to satisfy requests to increase the number of servers 163 for a particular queue, thus avoiding the overhead of starting an entirely new server.

FIG. 5 illustrates the server ready user average graph. The server ready user average graph is used to predict the demand for servers 163 when assessing a change in the number of servers 163 for a queue 161. The graph can show the point at which work requests 162 will start backing up. The abscissa (x) value is the number of servers 163 available to the queue 161. The ordinate (y) value is the maximum number of work requests 162 ready to execute.

FIG. 6 illustrates the queue delay graph. The queue delay graph is used to assess the value of increasing or decreasing the number of servers 163 for a queue 161. The graph shows how response time may be improved by increasing the number of queue servers 163 or how response time may be degraded by reducing the number of queue servers 163. It also will implicitly consider contention for resources not managed by the workload manager 105 which might be caused by adding additional servers 163, for example, database lock contention. In such a case the queue delay on the graph will not decrease as additional servers 163 are added. The abscissa value is the percentage of ready work requests 162 that have a server 163 available and swapped in. The ordinate value is the queue delay per completion.

Performance index deltas for increases in the number of servers 163 are calculated as follows:

For response time goals:

$$(\text{projected local performance index delta}) = \frac{\text{projected queue delay} - \text{current queue delay}}{\text{response time goal}}$$

$$(\text{projected multi-system performance index delta}) = \frac{(\#\text{ of local completions}) \times (\text{proj local perf index delta})}{\#\text{ of total completions across all systems}}$$

For velocity goals:

$$(\text{new\_local\_velocity}) = \frac{cpuu + ((cpuu/oldserver) * newserver)}{non\_idle + ((qd/qreq) * newserver)}$$

$$(\text{local pi\_delta}) = \frac{current\_local\_pi - goal}{new\_local\_velocity}$$

Where:

cpuu is the local CPU-using samples;

oldserver is the number of servers 163 before the change being assessed is made;

newserver is the number of servers 163 after the change being assessed is made;

non-idle is the total number of local non-idle samples;

qd is the local queue delay samples; and qreq is the local number of work requests 162 on the queue 161.

The formulas for the multi-system velocity performance index delta are similar except the sample values are totals across all the systems being managed rather than the local system 100.

Similar calculations are used to calculate performance index deltas for decreases in the number of servers 163.

The invention is preferably implemented as software (i.e., a machine-readable program of instructions tangibly embodied on a program storage devices) executing on one or more hardware machines. While a particular embodiment has been shown and described, it will be apparent to those skilled in the art that other embodiments beyond the ones specifically described herein may be made or practiced without departing from the spirit of the invention. It will also will be apparent to those skilled in the art that various equivalents may be substituted for elements specifically disclosed herein. Similarly, changes, combinations and modifications of the presently disclosed embodiments will also be apparent. For example, multiple queues may be provided for each service class rather than the single queue disclosed herein. The embodiments disclosed and the details thereof are intended to teach the practice of the invention and are intended to be illustrative and not limiting. Accordingly, such apparent but undisclosed changes, combinations, and modifications are considered to be within the spirit and scope of the present invention.

What is claimed is:

1. In an information handling system in which incoming work requests belonging to a first service class are placed in a queue for processing by one or more servers requiring other system resources, said system also having units of work assigned to one or more other service classes, a method of controlling the number of said servers, comprising the steps of:

defining a performance measure for each of said first and said other service classes;

determining the positive effect on the performance measure for said first service class of adding a predetermined number of servers to said first service class;

selecting one of said other service classes as a donor class from which to obtain the other system resources necessary to add said predetermined number of servers to said first service class;

determining the negative effect on the performance measure for said donor service class of obtaining from said donor class said other system resources necessary to add said predetermined number of servers to said first service class; and adding said predetermined number of servers to said first service class only if the positive effect on the performance measure for said first service class outweighs the negative effect on the performance measure for said donor service class.

2. The method of claim 1 in which said performance measure is based at least in part upon response time.

3. The method of claim 1 in which said performance measure is based at least in part upon execution velocity.

4. In an information handling system in which incoming work requests belonging to a first service class are placed in a queue for processing by one or more servers requiring other system resources, said system also having units of work assigned to one or more other service classes, apparatus for controlling the number of said servers, comprising:

means for defining a performance measure for each of said first and said other service classes;

means for determining the positive effect on the performance measure for said first service class of adding a predetermined number of servers to said first service class;

means for selecting one of said other service classes as a donor class from which to obtain the other system resources necessary to add said predetermined number of servers to said first service class;

means for determining the negative effect on the performance measure for said donor service class of obtaining from said donor class said other system resources necessary to add said predetermined number of servers to said first service class; and means for adding said predetermined number of servers to said first service class only if the positive effect on the performance measure for said first service class outweighs the negative effect on the performance measure for said donor service class.

5. A program storage device readable by a machine, tangibly embodying a program of instructions executable by the machine to perform method steps for controlling the number of servers assigned to a first service class in an information handling system in which incoming work requests belonging to said first service class are placed in a queue for processing by one or more of said servers, said servers requiring other system resources, said system also having units of work assigned to one or more other service classes, said method steps comprising:

defining a performance measure for each of said first and said other service classes;

determining the positive effect on the performance measure for said first service class of adding a predetermined number of servers to said first service class;

selecting one of said other service classes as a donor class from which to obtain the other system resources necessary to add said predetermined number of servers to said first service class;

determining the negative effect on the performance measure for said donor service class of obtaining from said donor class said other system resources necessary to add said predetermined number of servers to said first service class; and adding said predetermined number of servers to said first service class only if the positive effect on the performance measure for said first service class outweighs the negative effect on the performance measure for said donor service class.

6. The program storage device of claim 5 in which said other system resources comprise storage.

7. The method of claim 1 in which said other system resources comprise storage.

8. The apparatus of claim 4 in which said other system resources comprise storage.

9. The method of claim 1 in which said step of determining the positive effect on the performance measure for said first service class of adding a predetermined number of servers to said first service class comprises the steps of:

determining a current queue delay for said first service class;

determining a projected queue delay for said first service class with said predetermined number of servers added to said first service class; and comparing said projected queue delay with said current queue delay.

10. The apparatus of claim 4 in which said means for determining the positive effect on the performance measure for said first service class of adding a predetermined number of servers to said first service class comprises:

means for determining a current queue delay for said first service class;

means for determining a projected queue delay for said first service class with said predetermined number of servers added to said first service class; and means for comparing said projected queue delay with said current queue delay.

11. The program storage device of claim 5 in which said step of determining the positive effect on the performance measure for said first service class of adding a predetermined number of servers to said first service class comprises the steps of:

determining a current queue delay for said first service class;

determining a projected queue delay for said first service class with said predetermined number of servers added to said first service class; and comparing said projected queue delay with said current queue delay.

* * * * *